May 29, 1956 J. P. ECKERT, JR., ET AL 2,748,270

GATING SYSTEM

Filed March 31, 1952

INVENTORS
JOHN PRESPER ECKERT, JR.
JAMES R. WEINER
BY George V. Eltgroth
Ralph W. C. Bitner
ATTORNEYS 2,748,270
Patented May 29, 1956

2,748,270

GATING SYSTEM

John Presper Eckert, Jr., Gladwyne, and James R. Weiner, Philadelphia, Pa., assignors to Sperry Rand Corporation, a corporation of Delaware Application March 31, 1952, Serial No. 279,716

16 Claims. (Cl. 250—27)

This invention relates to a clock gate circuit used in computing systems for retiming and reforming electric pulses. In greater detail, it relates to a system employing vacuum amplifier tubes and diode elements under control of a master timing oscillator which restores a degraded timing pulse and produces a new square topped wave for a delay line or other circuits where a correctly timed wave is necessary.

It has been found that a considerable number of tubes and other circuit components could be saved by designing electronic computers to perform in a serial manner. In accordance with this design, storage of digits is accomplished in recirculating lines, either using a mercury tank or a system of delay lines, comprising a series of inductors arranged in parallel with a like series of capacitors. A single pulse is started by a master timing unit and applied to one end of the delay line. The pulse travels through the line at a velocity which is considerably reduced from the ordinary velocity of electric pulses in the usual form of transmission circuit. By providing terminals along the line, spaced at desired points, a number of voltage pulses can be obtained which differ from each other by a small unit of time. These pulses can then be used for opening gates, controlling sequential operations in the computer, and for other valuable circuit uses. A complete cycling circuit has been described in application Serial No. 279,156, filed March 28, 1952, by John P. Eckert, Jr., James R. Weiner, Robert F. Shaw, and Albert A. Auerbach.

After traveling through the delay line, the pulse form is changed considerably and before being recirculated, is applied to a reforming circuit which produces a pulse having the original form sent out by the start circuit. It is also possible that, due to changes in temperature and contact potentials, the pulse timing may be off as much as 10 per cent. It is therefore necessary to retime the recirculating pulse; otherwise, after a number of transmissions through the delay line, it will get completely out of step and one or more cycles may be lost. The present invention comprises a comparatively simple circuit for accomplishing this retiming and reforming action. It includes an input amplifier stage, a diode gate to which pulses may be applied from a master oscillator and a flip-flop circuit comprising two vacuum tubes and stable in either one of two states of conduction. The output of the flip-flop provides the new retimed and reformed pulse.

One of the objects of this invention is to provide an improved clock gate circuit which avoids one or more of the disadvantages and limitations of prior art circuits.

Another object of the invention is to provide an accurately timed pulse for a recirculating delay line.

Another object of the invention is to provide a reformed pulse, having the proper amplitude and the proper time duration for the delay circuits in which the pulse is to be used.

A further object of this invention is to provide a new and improved pulse-forming circuit.

For a better understanding of the present invention, together with other and further objects thereof, reference is made to the following description taken in connection with the accompanying drawings.

Figure 1:
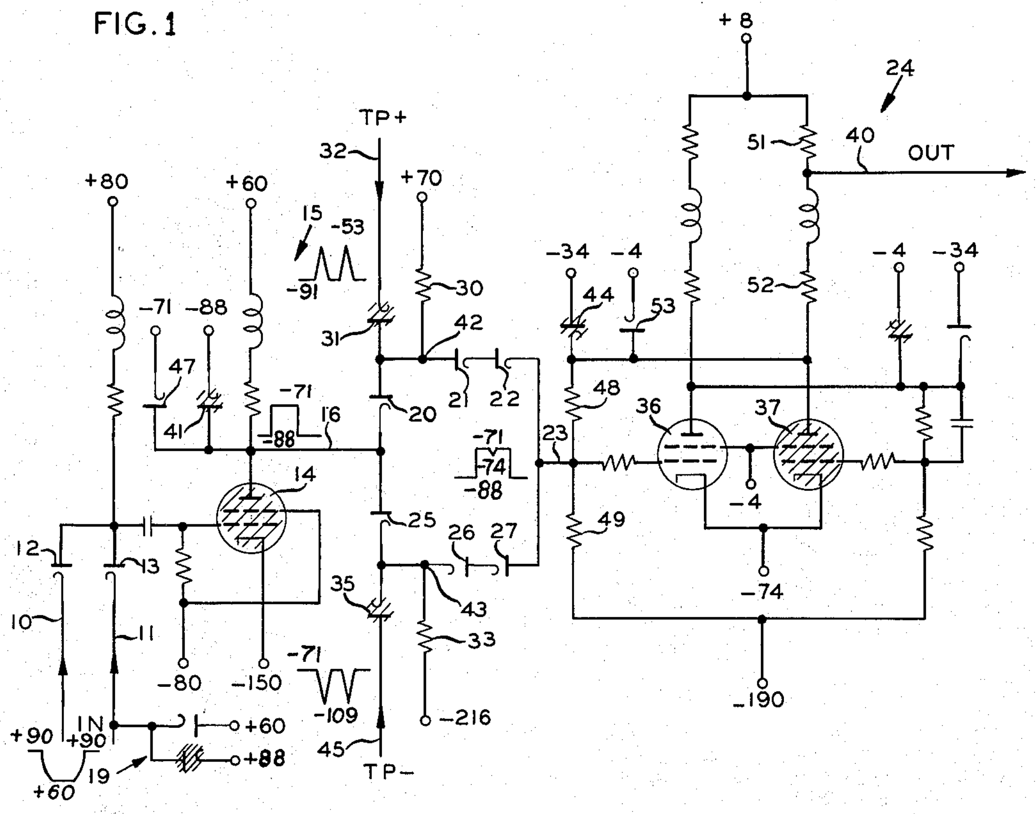
Fig. 1 is a schematic diagram of connections of the clock gate, including a flip-flop output circuit, an input gate, and a vacuum tube amplifier.

Referring now to Fig. 1, two input conductors 10 and 11 are shown in series with diode elements 12 and 13. These two buffer elements 12 and 13 permit the operation of the clock gate circuit by either one of two input pulses. One of the inputs is generally connected to the end, or output position, of a delay line (not shown) and is part of the recirculating system. The other input is generally connected to a start generator (not shown) for generating a start pulse; this circuit being employed to start the delay line with a definite time relationship to some initial event. Both input circuits are limited by a set of diodes 19 to voltage values of +60 and +90. A vacuum tube 14 is part of an amplifier stage which transfers the input pulse from the buffer circuit to the clock gate system. The anode of this tube 14 is limited between definite voltage excursions indicated in Fig. 1 as —71 volts and —88 volts. These limits are held by two diodes 41 and 47 and a power supply which is not shown. Tube 14 is normally conducting and its output is connected over anode conductor 16 to a bridge type of clock gate comprising eight diode elements 26, 20, 21, 22, 25, 27, 31 and 35. Diodes 20, 21, and 22 are connected in series between conductor 16 and an input conductor 23 which applies pulses to a flip-flop circuit 24. Diodes 25, 26, and 27 are connected in a similar manner, the second set of three being in parallel with the first set of three. Between diodes 20 and 21, a source of positive potential is applied to a resistor 30 from a positive source of potential (not shown) which, in this case, is indicated at 70 volts positive. The junction point of diodes 20 and 21 is also connected to the positive timing pulses in series with another diode 31. The positive timing pulses are applied to conductor 32, their form and voltage value being indicated in the second graph in Fig. 2. At the junction point of diodes 25 and 26, a negative source of potential is connected through a resistor 33. The value of this potential is normally 216 volts negative. At this same junction point, a series of negative timing pulses are applied from the master timing oscillator over conductor 45 through another diode 35. The form and magnitude of the negative timing pulses are shown in the third graph of Fig. 2.

The flip-flop circuit shown in Fig. 1 is controlled entirely by the potential of the No. 1 grid in a first vacuum tube 36, which is normally nonconductive. A second vacuum tube 37 is normally conductive, but may have its conductance transferred to the first tube in a manner which is well known and which has been described in printed publications. This circuit is sometimes called a toggle flip-flop since it operates when the potential of the input conductor 23 has been increased to a value which is above a certain well-defined critical value and may be restored to its original condition by lowering the potential of this same input conductor to a value below a second critical value. Each of the anode circuits of tubes 36 and 37 is limited in voltage excursions by a set of diode limiters 44 and 53 connected to sources of potential as indicated in the drawing. The output circuit of this system comprises a conductor 40 which is connected to one point of the anode circuit of the second tube 37. This output conductor transmits a square topped wave shown in the fourth graph in Fig. 2 which, in this example, varies from a −17 volts to a +2 volts. Other values of output pulses can be derived from this flip-flop circuit by being connected to other points on this anode circuit or to points on the anode circuit of tube 36.

Figure 2:
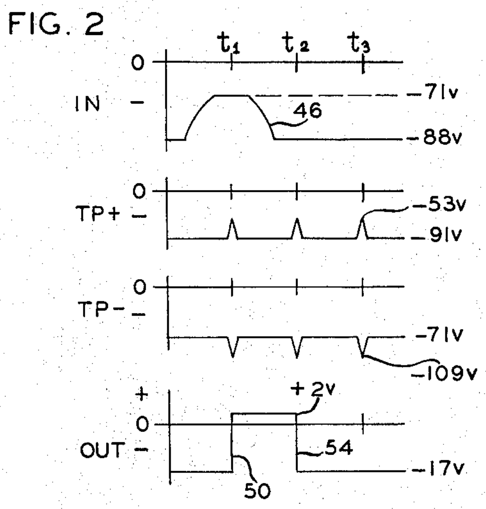
Fig. 2 is a series of graphs showing the input pulse, the output pulse, and two control pulses sent out by a master timing oscillator.
Figure 2:
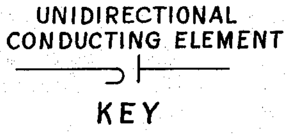

The first graph in Fig. 2 indicates the probable form of a degraded pulse which is applied to the input circuit of the clock gate system. Such a degraded pulse, presumably, had the original form and amplitude shown in the fourth graph. By the proper selection of a point along a delay line, the degraded pulse is timed to appear in the input circuit at approximately the time its maximum amplitude coincides with a maximum amplitude of one of the master timing pulses. Considerable latitude is permissible in the time of arrival of this pulse and as much as 15 per cent plus or minus the desired value will still produce a well-formed and correctly timed output pulse.

The operation of this circuit is as follows:

Let it first be assumed that the circuit is in a quiescent condition and that a pulse has not been received on either one of the input lines 10 or 11 and that the timing pulses are not at the instant applied to conductors 32 and 45. Also, the flip-flop circuit 24 is in its restored condition with tube 36 nonconductive. Under these conditions, tube 14 is conductive; its anode being held at a potential of −88 volts due to the diode limiter 41. Conductor 32 is a potential of −91 volts, while conductor 45 is at a potential of −71 volts; these potentials being provided by the master oscillator circuit when no pulses are being transmitted. Because of these voltages, diode 31 conducts current derived through resistor 30 and point 42 is maintained at −91 volts. In a similar manner, diode 35 also conducts, drawing current through resistor 33 and maintaining point 43 in the circuit at a potential of −71 volts. The other diodes in the clock gate circuit are not conductive and the input conductor 23 to the first tube 36 of flip-flop circuit 24 assumes a value of −90 volts by virtue of the voltage divider 48, 49 connected between the negative supply of −190 volts and the conducting diode 44 connected to −34 volts. The grid potential of tube 36 being at −90 volts when the cathode is at −74, will result in a nonconducting state for tube 36, while tube 37 is in the conductive state. The output conductor 40 assumes a value of −17 volts by virtue of the voltage dividers 51, 52 connected between the anode voltage source of +8 volts and the conducting diode 44 having a limiting value of −34 volts. These voltages have been chosen in order to present an output non-operating voltage which can be applied to a number of vacuum tube grid circuits to cut-off the tubes when their cathodes are grounded or at zero potential.

Now, let it be assumed that without any input pulse applied to either conductors 10 or 11, a positive-going pulse is applied to conductor 32 which will raise its voltage from −91 volts to −53 volts and, at the same time, a negative-going pulse is applied to conductor 45, lowering its voltage from −71 volts to −109 volts. As these pulses are applied, diodes 31 and 35 will remain conductive only until the voltages reach −88 volts. At that potential, the voltage of conductor 16 will be determined by the value of diode 41 which is connected to a −88 volts supply and thereafter diodes 20 and 25 will pass current, establishing a voltage of −88 volts for both terminals 42 and 43. Since point 42 is more positive than the previous quiescent value of conductor 23, diodes 21 and 22 will conduct and put a value of −88 volts on conductor 23. This change in voltage (−90 to −88) is not enough to disturb the condition of the flip-flop circuit.

From the above, it will be seen that as long as tube 14 remains conductive and tube 36 is nonconductive, the positive and negative control pulses from the master oscillator may be applied to conductors 32 and 45 without causing any result to flip-flop circuit 24.

Now, let it be assumed that seen input pulse is applied to either one of conductors 10 or 11, the general form of this pulse being indicated by the first curve 46 shown in Fig. 2. Since the anodes of diodes 12 and 13 are held at +80 volt potential, the diodes will not conduct until pulse 46 has decreased in voltage from +91 to +80 volts. Thereafter, the diodes will conduct and a negative pulse of about 20 volts will be applied to tube 14, cutting off the anode-cathode current and raising the voltage of its anode from −88 volts to −71 volts. The latter value is maintained by diode 47 connected to a voltage supply. When conductor 16 is given a value of −71 volts with no timing pulses applied to either conductors 32 or 45, diodes 20 and 25 will not conduct and the voltage of point 42 will remain at −91 volts and the voltage of point 43 will remain at the value of −71 volts there being no change in the voltage of input conductor 23. This means that in the absence of timing impulses from the master oscillator, no output pulses will be applied to the flip-flop circuit, even though tube 14 is changed from a conductive to a nonconductive condition.

Now, let it be assumed that a pulse is received on one of the input conductors 10 or 11 at the same time that timing pulses are applied to conductors 32 and 45. This is the condition shown in Fig. 2 at time $t_1$. Tube 14 is not conductive and conductor 16 is at a value of −71 volts. Conductor 32 is raised from −91 volts to −53 volts, while conductor 45 is lowered from −71 volts to −109 volts. Under these conditions, diodes 31 and 35 are made nonconductive, the potential of points 42 and 43 is raised to −71 volts and diodes 20, 25, 21, and 22 conduct. This action applies a voltage of −71 volts to conductor 23, thereby raising the voltage of the control electrode of tube 36 from a −88 volts to a potential which is 3 volts more than the potential of the cathode. The tube 36 conducts and, in so doing, cuts off the current in tube 37 causing a positive rise in voltage in the anode circuit of tube 37. This rise is communicated by output conductor 40 and causes the rise in voltage 50 indicated in the lower graph in Fig. 2.

After the actuation of the flip-flop circuit 24, the voltage of conductor 23 remains at approximately −74 volts, being held to that value by the increased voltage of the anode in tube 37 which is held to a −4 volts by a diode limiter 53. The input pulse delivered over conductor 11 now returns to its original value of +90 volts, diode 13 is cut off, and tube 14 again is placed in a conductive condition, lowering the potential on conductor 16 to −88 volts. This change in tube 14 occurs a short time interval before the next timing pulses at time $t_2$ are sent to conductors 32 and 45. In the time interval before the timing pulses are applied, diodes 20 and 25 will be made nonconductive and diodes 21 and 22 will also be made nonconductive. Diodes 31 and 35 will pass current for a short time, assigning voltage values of −91 and −71 volts to points 42 and 43 respectively. Since diodes 35, 26, and 27 are conducting, the voltage on conductor 23 will be held at about −71 volts, a change of 3 volts, which will not affect the condition of the flip-flop circuit 24.

At time $t_2$ there will be no input applied to either input circuit 10 or 11, tube 14 will be in a conductive state, and conductor 16 will be returned to its previous value of −88 volts. Timing pulse potentials are now applied through conductors 32 and 45, making the voltage values of these conductors −53 and −109 volts respectively. Under these conditions, diodes 20 and 25 will conduct and the voltage of points 42 and 43 will be maintained at a −88 volts. Since, at this instant, conductor 23 is at −71 volts, diodes 21 and 22 will not conduct since their cathodes are at a higher potential than their anodes. But diodes 26 and 27 will conduct because of the potential difference, −88 to −71, that exists between their cathodes and anodes. The conduction through these latter diodes immediately lowers the voltage on conductor 23 from −74 to −88, thereby applying a negative pulse to tube 36 to cause its conductance to be reduced to zero and transferring this conductance to tube 37. This action causes a decrease in anode current to tube 37, which causes a steep reduction in voltage on output conductor 40, which is represented by the line 54 in the graph at the bottom of Fig. 2.

At the next time $t_3$, there is no input pulse to tube 14 and the condition of the flip-flop circuit 24 has been restored to its original condition. Therefore, the positive and negative timing pulses occurring at time $t_3$ will have no influence on the circuit, as has already been described. The combination of the rise 50 and fall 54, as shown in the graph at the bottom of Fig. 2, constitutes the new retimed and reformed pulse which is transmitted over conductor 40 to the input of a delay line or to any other utilization circuit. It will be seen from a study of the graphs in Fig. 2, that the retimed pulse has been delayed about one half pulse time due to the process of formation. For best results, the degraded pulse 46 is applied to the clock gate one half pulse time before the desired time of the retimed pulses 50, 54.

The voltages designated on the schematic diagram in Fig. 1 were chosen for a specific example and for a specific purpose. The tubes chosen in this circuit were type 25L6 vacuum tubes. Other constants which were used in this circuit are as follows:

| | |
|---|---|
| Crystal diodes | Type IN48 |
| Resistors **51** and **52** ohms | 560 |
| Resistor **48** do | 18,000 |
| Resistor **49** do | 31,700 |
| Resistors **30** and **33** do | 10,000 |

From the above description it will be evident that a pulse forming and retiming circuit has been provided which receives a degraded and deformed pulse and produces an accurately formed and correctly timed pulse in its output circuit.

While there have been described and illustrated specific embodiments of the invention, it will be obvious that various changes and modifications may be made therein without departing from the field of the invention which should be limited only by the scope of the appended claims.

What is claimed is:

1. A clock gate circuit for retiming and reforming a degraded pulse under control of positive and negative timing pulses comprising: a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal for applying a positive-going timing pulse in series with a diode; and second circuit means connected to the second supply terminal for applying a negative-going timing pulse in series with a diode.

2. A clock gate circuit for retiming and reforming a degraded pulse under control of positive and negative timing pulses comprising: a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal for applying a positive-going timing pulse in series with a diode arranged to pass current only from the first supply terminal; and second circuit means connected to the second supply terminal for applying a negative-going timing pulse in series with a diode arranged to pass current only to the second supply terminal.

3. A clock gate circuit for retiming and reforming a degraded pulse under control of positive and negative timing pulses comprising: a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal for applying a positive-going timing pulse in series with a diode arranged to pass current only from the first supply terminal; second circuit means connected to the second supply terminal for applying a negative-going timing pulse in series with a diode arranged to pass current only to the second supply terminal; and third circuit means for maintaining all of the diodes in the bridge arms in a nonconductive condition in the absence of a degraded pulse applied to the input terminal and with the flip-flop circuit in a restored condition, whereby the flip-flop circuit receives no actuating voltage pulse.

4. A clock gate circuit for retiming and reforming a degraded pulse under control of positive and negative timing pulses comprising; a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal for applying a positive-going timing pulse in series with a diode arranged to pass current only from the first supply terminal; second circuit means connected to the second supply terminal for applying a negative-going timing pulse in series with a diode arranged to pass current only to the second supply terminal; and means for applying circuit biasing voltages to the input terminal and to the two bridge supply terminals for insuring that an actuating voltage is not applied to the flip-flop circuit in the absence of a degraded input pulse at the input terminals when the flip-flop circuit is in a restored condition and when said timing pulses are applied to the bridge supply terminals.

5. A clock gate circuit for retiming and reforming a degraded pulse under control of positive and negative timing pulses comprising; a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal for applying a positive-going timing pulse in series with a diode arranged to pass current only from the first supply terminal; second circuit means connected to the second supply terminal for applying a negative-going timing pulse in series with a diode arranged to pass current only to the second supply terminal; and third circuit means for applying an actuating pulse to the flip-flop circuit to transfer conduction from the restored condition to a set condition when a degraded input pulse is applied to the input terminal and said timing pulses are applied to the two bridge supply terminals.

6. A clock gate circuit for retiming and reforming a degraded pulse under control of positive and negative timing pulses comprising; a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal for applying a positive-going timing pulse in series with a diode arranged to pass current only from the first supply terminal; second circuit means connected to the second supply terminal for applying a negative-going timing pulse in series with a diode arranged to pass current only to the second supply terminal; and third circuit means for applying an actuating pulse to the flip-flop circuit to transfer conduction from a set condition to a restored condition in the absence of an input pulse when said timing pulses are applied to the two bridge supply terminals.

7. A clock gate circuit for retiming and reforming a degraded pulse under control of positive and negative timing pulses comprising; a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal applying a positive-going timing pulse in series with a diode arranged to pass current only from the first supply terminal; second circuit means connected to the second supply terminal applying a negative-going timing pulse in series with a diode arranged to pass current only to the second supply terminal; means for applying a first biasing voltage to the input circuit in the absence of an input pulse to cause conduction through the diodes in the arms between the bridge supply terminals and the input terminal; and means for applying a second biasing voltage to the output circuit when the flip-flop circuit is in a restored condition, which second biasing voltage causes conduction through the diode in the bridge arm between the output terminal and the first supply terminal, said first and second biasing voltages insuring that an actuating pulse is not applied to the flip-flop circuit.

8. A clock gate circuit for retiming and reforming a degraded pulse under control of positive and negative timing pulses comprising; a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal applying a positive-going timing pulse in series with a diode arranged to pass current only from the first supply terminal; second circuit means connected to the second supply terminal applying a negative-going timing pulse in series with a diode arranged to pass current only to the second supply terminal; means for applying a pulse voltage to the input circuit when a degraded pulse is received, said pulse voltage causing all the diodes in the bridge arms to conduct except the diode in the arm between the second supply terminal and the output terminal and thereby producing an actuating pulse to change conductance in the flip-flop circuit.

9. A clock gate circuit for retiming and reforming a degraded pulse under control of positive and negative timing pulses comprising; a bridge circuit containing four arms, the junction points of said arms employed as, an input terminal, an output terminal, a first bridge supply terminal, and a second bridge supply terminal opposite the first such terminal; an input circuit, the voltage of which is controlled by the degraded pulse and which is connected to the input terminal of the bridge; a flip-flop circuit for providing a retimed and reformed pulse, said flip-flop circuit having an input connected to the output terminal of the bridge; a source of positive potential connected to the first bridge supply terminal and a source of negative potential connected to the second bridge supply terminal; each of said arms including a diode arranged to pass current only in a direction from the positive supply terminal; first circuit means connected to the first supply terminal applying a positive-going timing pulse in series with a diode arranged to pass current only from the first supply terminal; second circuit means connected to the second supply terminal applying a negative-going timing pulse in series with a diode arranged to pass current only to the second supply terminal; means for applying a biasing voltage to the input circuit in the absence of an input pulse to cause all the diodes in the bridge arms to conduct except the diode in the arm between the first supply terminal and the output terminal when said flip-flop circuit is in the actuated condition, whereby an actuating pulse is applied to the flip-flop circuit to cause it to transfer conduction and revert to the restored condition.

10. A pulse forming circuit comprising the combination of a pulse generator having a first state of conduction and a second state of conduction, said pulse generator being responsive to first and second input potentials of predetermined levels to switch to said first and said second states of conduction respectively and being maintained in its current state of conduction at potentials between said first and second potentials, and an input circuit having its output connected to the input of said pulse generator for providing said first and second predetermined potentials, said input circuit comprising at least one unilateral conduction device, means for applying a biasing potential between said first and second potentials to said device to maintain said pulse generator in its current state of conduction, means for applying first timing pulses to said device, said first timing pulses tending to provide said first predetermined potential, means for applying input pulses to said device, the application of said input pulses tending to provide said first predetermined potential, the concurrent application of a first timing pulse and an input pulse providing said first predetermined potential, and means for applying second timing pulses to said device simultaneously with said first timing pulses, the application of said second timing pulses tending to provide said second predetermined potential, said second timing pulses being insufficient to counteract the concurrent application of said first timing pulses and said input pulses to said device.

11. A pulse forming circuit comprising the combination of a toggle pulse generator having a first and a second state of conduction, said pulse generator being responsive to first and second input potentials of predetermined levels to switch to said first and second states of conduction respectively, and an input circuit having its output connected to the input of said pulse generator for providing said first and second predetermined potentials, said input circuit comprising at least one unilateral conduction device, means for applying a biasing potential between sad first and second potenials to said device to maintain said pulse generator in its extant state of conduction, means for applying first timing pulses to said device, said first timing pulses tending to provide said first predetermined potential, means for applying input pulses to said device, the application of said input pulses tending to provide said first predetermined potential, the concurrent application of a first timing pulse and an input pulse providing said first predetermined potential, and means for applying second timing pulses to said device simultaneously with said first timing pulses, the application of said second timing pulses tending to provide said second predetermined potential, said second timing pulses being insufficient to counteract the concurrent application of said first timing pulses and said input pulses.

12. The pulse forming circuit defined in claim 11 wherein said means for applying first timing pulses comprises a first unilateral impedance connected to said device in such a manner as to apply positive-going timing pulses thereto.

13. The pulse forming circuit defined in claim 11 wherein said means for applying said second timing pulses comprises a second unilateral impedance connected to said device in such a manner as to apply negative-going timing pulses thereto.

14. The pulse forming circuit defined in claim 11 wherein said input circuit comprises a plurality of unilateral conduction devices so arranged as to conduct current in the direction from said means for applying said first timing pulses to said means for applying said second timing pulses.

15. The pulse forming circuit defined in claim 11 wherein said input circuit comprises at least four unilateral conduction devices arranged in the form of a bridge circuit, said devices comprising the respective arms of said bridge circuit, said bridge circuit having four terminals, each said terminal comprising a junction between adjacent devices, said first timing pulses being applied to a first terminal, said second timing pulses being applied at a second terminal which is diagonally opposite said first terminal, said input pulses being applied at a third terminal, and said fourth terminal which is diagonally opposite said third terminal constituting said output which is connected to the input of said pulse generator, said devices in said bridge circuit being poled to conduct current in a direction from said first terminal to said second terminal.

16. A pulse forming circuit comprising a toggle flip-flop circuit, and an input circuit therefor, said toggle flip-flop circuit having first and second states of conduction and being responsive to a first voltage of a predetermined amplitude to switch to said first state of conduction and responsive to a second voltage of a predetermined amplitude different from the amplitude of said first voltage to switch to said second state of conduction, said toggle flip-flop circuit remaining in its extant state of conduction for all values of voltage between said first and second voltages, said voltages being applied to the input of said toggle flip-flop circuit, said toggle flip-flop circuit generating an output pulse each time it switches from said second state of conduction to said first state of conduction, said input circuit comprising a plurality of unilateral conduction devices arranged in the form of a bridge circuit with at least one said device in each of the arms of said bridge circuit, said bridge circuit having four terminals, each said terminal comprising a junction between adjacent devices, a first unilateral impedance connected to a first terminal for applying positive-going timing pulses to said bridge circuit, a second unilateral impedance connected to a second terminal which is diagonally opposite said first terminal for applying negative-going timing pulses to said bridge circuit simultaneously with the application of said positive-going timing pulses, means for applying positive-going input pulses to a third terminal of said bridge circuit, the fourth terminal of said bridge circuit being diagonally opposite said third terminal and being connected to the input of said toggle flip-flop to apply said voltages thereto, said devices being poled to conduct current in a direction from said first terminal to said second terminal, means for applying a positive biasing voltage to said first terminal, means for applying a negative biasing voltage to said second terminal, said biasing voltages providing an input voltage to said toggle flip-flop for maintaining said toggle flip-flop in its extant state of conduction, the application of said positive-going timing pulse tending to provide said first voltage for said toggle flip-flop, the application of said input pulses tending to provide said first input voltage for said toggle flip-flop, the concurrent application of a positive-timing pulse and an input pulse providing said first voltage for said toggle flip-flop, the application of said negative-going timing pulses tending to provide said second voltage for said toggle flip-flop, said negative-going timing pulse being insufficient to counteract the concurrent application of said positive-going timing pulses and said input pulses.

References Cited in the file of this patent

UNITED STATES PATENTS

| | | |
|---|---|---|
| 2,233,860 | Wise | Mar. 4, 1941 |
| 2,443,195 | Pensyl | June 15, 1948 |
| 2,562,660 | Chance | July 31, 1951 |
| 2,563,406 | Goldberg | Aug. 7, 1951 |
| 2,618,753 | Van Mierlo | Nov. 18, 1952 |
| 2,625,662 | Gaynor et al. | Jan. 13, 1953 |
| 2,644,887 | Wolfe | July 7, 1953 |